Patented Apr. 14, 1953

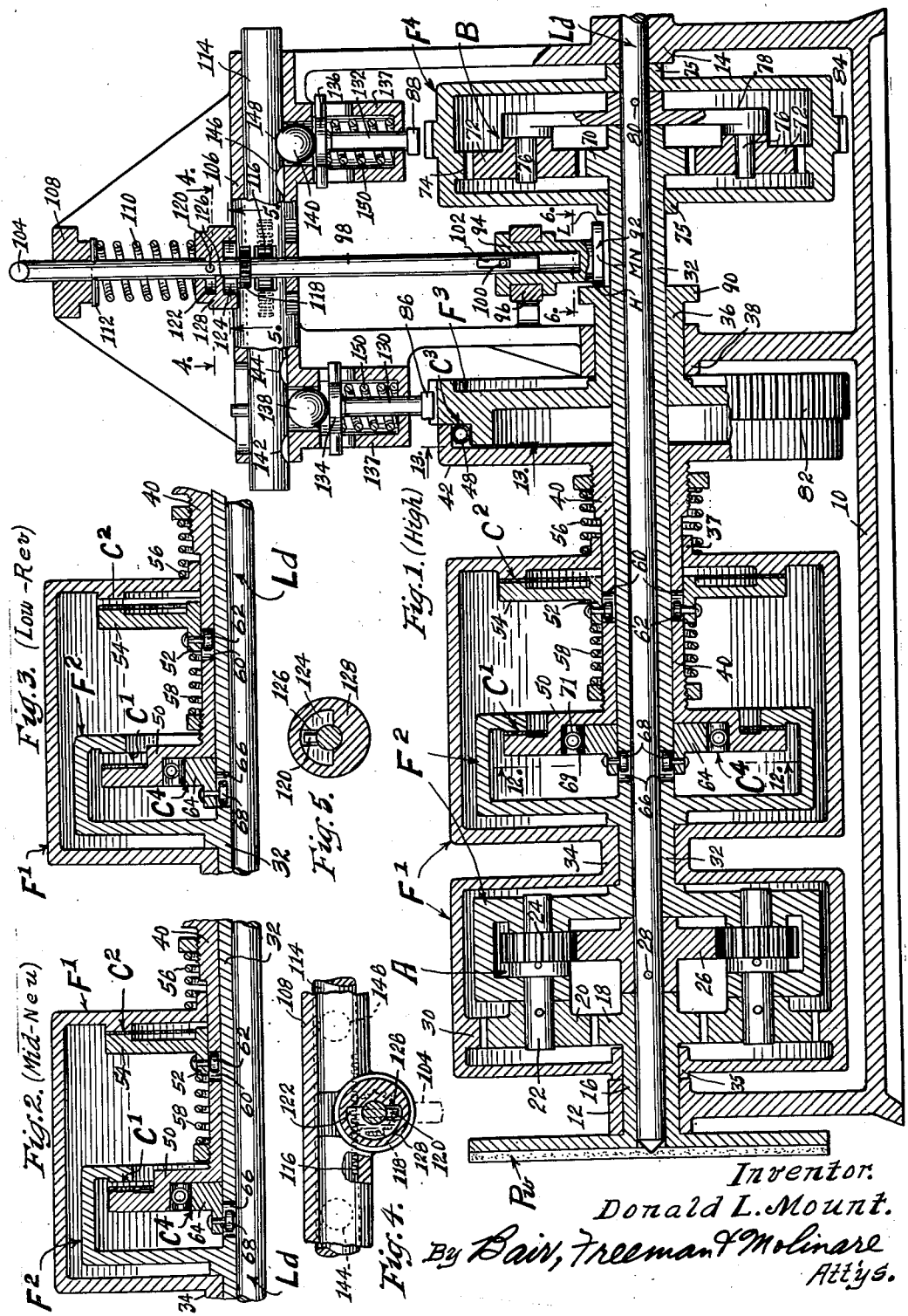

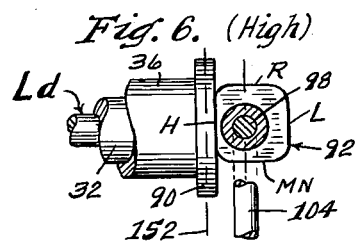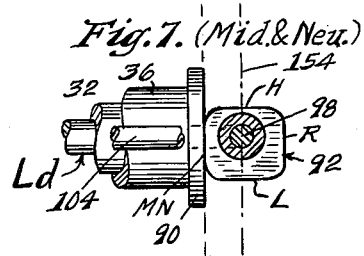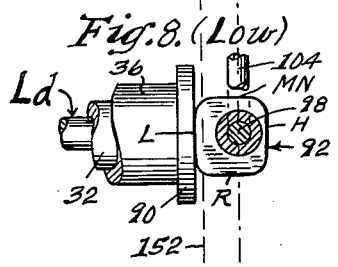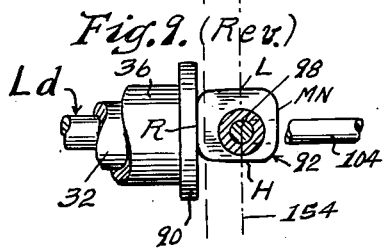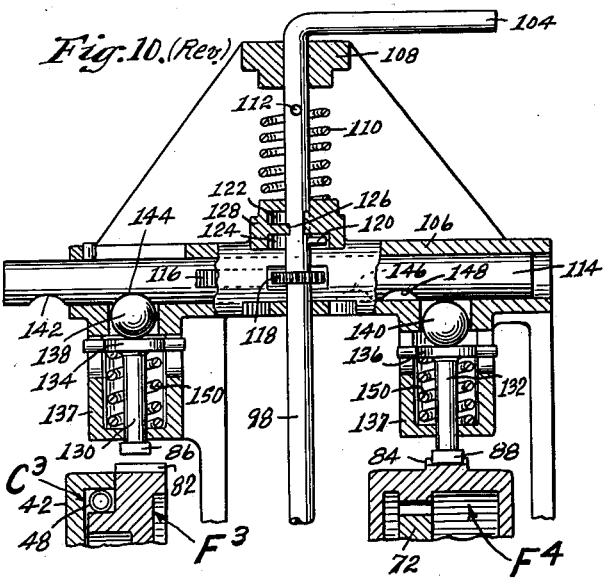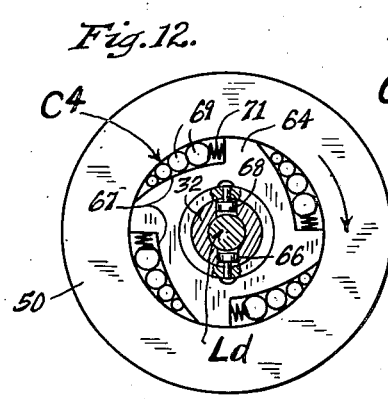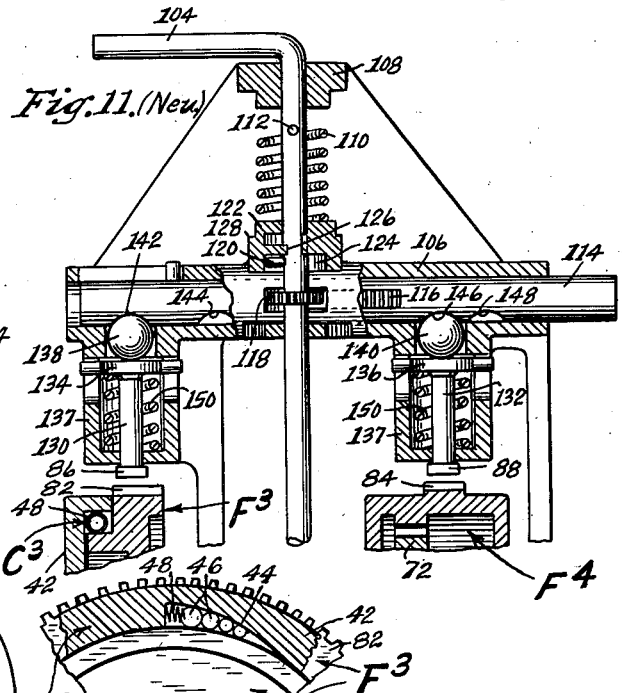

2,634,628

UNITED STATES PATENT OFFICE 2,634,628

POWER TRANSMISSION

Donald L. Mount, Memphis, Mo.

Application April 14, 1951, Serial No. 221,012

10 Claims. (Cl. 74—765)

This invention relates to a power transmission especially designed to be economically manufactured and particularly adaptable for tractors, automobiles, and other power machinery where shifting up and down in the forward speed range is accomplished without disconnecting the engine from a driven shaft and thereby losing the engine power to the driven shaft which drives the traction wheels.

In tractor use and other power machinery, it is desirable many times to change speed while in motion, and with power tools attached, since the loss of momentum during any gear change is very great, sometimes resulting in stopping of the tractor.

One object of the invention, therefore, is to provide a power transmission in which various gears of the transmission remain in mesh and a clutch arrangement in the transmission itself is operable to shift from one gear arrangement to the other while the power is constantly connected through the transmission and to the driven shaft without the necessity of having to throw out an engine clutch between gear shifts.

Another object is to provide a power transmission having an arrangement of gear trains and rotatable frames, with clutch arrangements between various elements of the transmission and the frames operable in response to a manually adjustable gear and clutch control arrangement.

Another object is to provide a gear train arrangement for forward speed combined with a rotatable frame arrangement in which there are clutch arrangements between the frame and other elements of the transmission including one frame that may be selectively held or released.

A further object is to provide a second gear train for the reverse movement of the driven shaft and including a rotatable frame which also may be selectively engaged to stop its rotation during the reverse operation of the transmission.

Still a further object is to provide a clutch arrangement which for high gear rotates the frames and gears all as a unit for direct drive and during intermediate or middle speed and low speed connects the clutches and frames in such an arrangement that one gear ratio is had for middle speed and another for low speed.

An additional object is to provide a gear changing lever which in three different positions controls the power transmission as to high speed, middle speed, or low speed and which can be shifted in such a way that in two of those positions it will effect reverse and neutral adjustments of the power transmission.

With these and other objects in view, my invention consists in the construction, arrangement and combination of the various parts of my power transmission, whereby the objects contemplated are attained, as hereinafter more fully set forth, pointed out in my claims and illustrated in the accompanying drawings, wherein:

Figure 1 is a vertical sectional view through a power transmission embodying my present invention showing a clutch disc at one end to which power is applied, and a load shaft at the other end, the power transmission being interposed between these two ends, the parts being shown in high speed position.

Figure 2 is a sectional view similar to a portion of Figure 1 showing the parts in middle speed position.

Figure 3 is a similar sectional view showing the parts in position for low speed.

Figure 4 is a sectional view on the line 4—4 of Figure 1 showing certain parts that are particularly adaptable to reverse and neutral adjustments of the power transmission.

Figure 5 is a sectional view on the line 5—5 of Figure 1 showing further details thereof.

Figure 6 is a detail sectional view on the line 6—6 of Figure 1 showing a speed shifting cam in the high speed position.

Figure 7 is a similar view showing the cam in position for middle speed and neutral.

Figure 8 is a similar view showing the cam in position for low speed.

Figure 9 is a similar view showing the cam in position for reverse.

Figure 10 is a view similar to the upper right hand portion of Figure 1 showing the parts in position for reverse.

Figure 11 is a similar view showing the parts in position for neutral.

Figure 12 is a sectional view on the line 12—12 of Figure 1 showing a clutch construction; and Figure 13 is a sectional view on the line 13—13 of Figure 1 showing another clutch construction.

On the accompanying drawing I have used the reference numeral 10 to indicate a base. Bearings 12 and 14 are located at the ends of the base for supporting various rotating elements of my power transmission.

A sleeve 16 is rotatable in the bearing 12 and a clutch disc Pw is carried thereby having power applied to it such as by a cooperating clutch disc (not shown) connected with a tractor engine or the like. The sleeve 16 has a gear 18 thereon and this gear meshes with a plurality of planetary gears 20 surrounding the gear 18.

The gears 20 are mounted on shafts 22 carried by a frame $F^2$. Each shaft 22 has a second planetary gear 24 thereon which gears mesh with a gear 26 mounted on a load shaft Ld, the gear 26 being pinned to the shaft as at 28.

A frame $F^1$ is also provided, and it carries an internal gear 30 meshing with the gears 20, the gears 18, 20 and 30 constituting a planetary gear system, and the gears 24 and 26 constituting a second planetary gear system. Both of these gear systems constitute a gear train which I designate generally at A.

The frame $F^2$ has a sleeve 32 surrounding the load shaft Ld, and the frame $F^1$ has a sleeve 34 surrounding the sleeve 32. The frame $F^1$ also has sleeves 35 and 37 surrounding the sleeve 16, and the sleeve 32, which it will be noted is of considerable length, terminates almost at the right hand end of the transmission. Thus the frames $F^1$ and $F^2$ are rotatable around the load shaft Ld.

A third frame $F^3$ is provided having a sleeve 36 also rotatably surrounding the sleeve 32, and the sleeve 36 is rotatable in an intermediate bearing 38 of the base 10. A sleeve 40 somewhat shorter than the sleeve 32 surrounds the intermediate portion of the sleeve 32 and is provided at its right hand end with a disc 42. The disc 42 and the frame $F^3$ are clutched together by a one-way clutch such as shown in Figure 13, the disc 42 being provided with a plurality of spiral surfaces 44 between which and the periphery of the frame $F^3$ rollers 46 are mounted and are urged toward the small end of the cavity thus provided by springs 48. Figure 13 shows only one of these one-way clutch arrangements, but several of them may be provided around the periphery of the frame $F^3$.

At the left hand end of the sleeve 40, a clutch disc 50 is provided and cooperates with the frame $F^2$ to provide a clutch shown generally at $C^1$. This is shown as a friction type clutch.

A third sleeve 52 surrounds the sleeve 40 and is provided with a clutch disc 54 to cooperate with the frame $F^1$ through a clutch arrangement shown generally at $C^2$.

A spring 56 is provided to normally retain the clutch $C^1$ engaged and a spring 58 is provided to normally retain the clutch $C^2$ engaged. The clutch disc 54 is slidable and non-rotatable relative to the sleeve 40 and relative to the clutch disc 42 of the clutch $C^3$ (this being the roller-type clutch shown in Figure 13). For this purpose an operative connection is provided by means of slots 60 in the sleeve 40 and rollers 62 carried by the sleeve 52 of the disc 54.

A fourth clutch $C^4$ is provided between the clutch disc 50 and another clutch disc 64. The clutch $C^4$ is also a roller type clutch as shown in Figure 12, the rollers at 69, the spiral surfaces at 67, and the springs at 71. The disc 64 is slidably and non-rotatably mounted on the sleeve 32 by means of a plurality of slots 66 in the sleeve 32 and rollers 68 carried by the disc 64.

A fourth frame $F^4$ is provided having sleeves 75 rotatable on the sleeve 32 and the load shaft Ld. The frame $F^4$ carries an internal gear 74 with which a plurality of planetary gears 72 mesh, the gears 72 in turn meshing with a gear 70 on the sleeve 32. The gears 72 are rotatable on studs 76 of a disc 78 secured to the load shaft Ld by a pin 80. The gears 70, 72 and 74 constitute a planetary gear mechanism, and a gear train which I have designated generally by the reference character B, this gear train being for reverse operation of the power transmission.

The frames $F^3$ and $F^4$ are provided with external teeth 82 and 84 for the purpose of locking these frames selectively against rotation in a manner and for a purpose which will hereinafter be described. The locking elements for cooperating with the teeth 82 and 84 are shown at 86 and 88 respectively. I will refer to these as locking lugs.

The sleeve 36 of the frame $F^3$ is provided at its right hand end with a speed shifting flange 90. A speed shifting cam 92 is adapted to coact therewith as will hereinafter be described. The cam 92 is mounted on a sleeve 94 rotatable in a bearing 96. A speed shifting shaft 98 is slidably and non-rotatably mounted with respect to the sleeve 94 by means of a pin and slot connection 100—102. The upper end of the shaft 98 terminates in a speed shifting handle 104.

A sleeve 106 is supported above the load shaft Ld and substantially parallel thereto. A bearing 108 is carried by the sleeve 106 and spaced thereabove for journalling the upper end of the speed shifting shaft 98. A spring 110 is interposed between a pin 112 of the shaft 98 and a hub 128 of the sleeve 106 to normally retain the shaft 98 and the speed shifting lever 104 in the upper position illustrated in Figure 1.

A shaft-like slide 114 is mounted in the sleeve 106 and has rack teeth 116 cut into the side thereof with which a pinion 118 on the speed shifting shaft 98 is adapted to mesh at times. The shaft 98 is also provided with a lateral pin 120 located in the hub 128.

The hub 128 has an upper arcuate slot 122 and a lower arcuate slot 124. These slots are substantially 180 degrees in extent and located 90 degrees apart relative to each other as evident by comparing Figures 4 and 5. They are connected by a vertical connecting slot 126 shown in Figures 1, 4 and 5.

Returning to the locking lugs 86 and 88, stems 130 and 132 extend upwardly therefrom and are connected with discs 134 and 136 vertically slidable in housings 137 depending from the sleeve 106. Balls 138 and 140 are located in the housings, and the slide 114 is provided with a plurality of notches 142, 144, 146 and 148 for coaction with the balls 138 and 140 as will hereinafter appear. To normally raise the locking lugs 86 and 88 and to engage the ball 138 with either the notch 142 or 144 when they are aligned therewith and the ball 140 with either of the notches 146 and 148 when they are aligned therewith, I provide a spring 150 in each of the housings 137.

In Figure 6 I show the various cam surfaces of the speed shifting cam 92. These are designated H for high, R for reverse, L for low, and MN for middle speed and neutral. The cam surfaces are of different height relative to the center of rotation of the cam except for R and MN which are substantially the same height. The cam surfaces result in shifting the speed shifting flange 90 to various positions as shown in Figures 6, 7, 8 and 9, a reference line of dash type shown at 152 being provided to compare the various positions of the flange 90 in the different speed adjustments of the transmission. Also a center line 154 for the cam in the various Figures 6, 7, 8 and 9 is illustrated for comparison.

*Practical operation*

In the operation of my power transmission, assuming first that the parts are in the position shown in Figure 1 for high speed operation, a direct connection is provided between the power receiving disc Pw and the load shaft Ld in the following manner, reference being had to the frames and clutches by their reference characters only. F¹ and F² are locked together because of the clutches C¹ and C² both being engaged. This precludes rotation of the gears 20 and 24 so that the entire assembly of gears 18, 20, 24 and 26 and the frames F¹ and F² will rotate as a unit thereby directly transmitting the rotation of Pw to Ld.

The frame F³ is locked against rotation by the locking lug 86 and the frame F⁴ is free to rotate as the locking lug 88 is out of mesh with the teeth 84. Accordingly, since the disc 42 is rotating as a unit with the frames F¹ and F², the one-way clutch C³ is operable to permit rotation of 42 relative to F³ and since the sleeve 32 and the load shaft Ld are rotating together at the same speed, there is no relative rotation between the gears 70 and 72. Therefore there can be no relative rotation between the gears 72 and 74 so that the frame F⁴ also rotates as a unit with the frames F¹ and F². Also during high speed operation, the clutch disc 64 rotates with the unit and the clutch C⁴ is inactive.

For the middle speed adjustment shown in Figure 2, the speed shifting lever 104 is swung from the position of Figures 1 and 6 to the position of Figure 7 so that the cam surface MN is against the flange 90 and this moves the sleeve 36, the clutch C³, and the sleeve 40 slightly toward the left as in Figure 2 with the clutch C¹ disengaged, but due to the length of the slots 60 the clutch C² remains engaged. Consequently, the frame F¹ is locked against rotation at the clutch C² and the frame F² is free to rotate. F³ is still locked and F⁴ is free.

The gear 18 is now being rotated by the power disc Pw and the frame F¹ is held stationary through the clutch C², the disc 54, the roller 60, the slot 62, the sleeve 40, the disc 42, and the one-way clutch C³ because the rotation of 18 causes rotation of 20 which in turn tends to rotate F¹ and 42 in the counter-clockwise direction so that the clutch C³ is effective to hold 42 and F¹ against rotation because of F³ being stationary.

Rotation of the gears 20 as they roll inside the internal gear 30 rotates the frame F² clockwise and this rotation together with the meshing of gears 24 and 26 causes clockwise rotation of the gear 26 and the load shaft Ld at a lower speed than the rotation of the gear 18. The load shaft Ld is therefore rotated at a middle speed by the gear train A and the gear train B idles with the frame F⁴ rotating in a clockwise direction.

For low speed operation, the cam 92 is shifted from the position of Figure 7 to the position of Figure 8 with the low speed cam surface L engaging the flange 90 and moving it still farther to the left so that in addition to the clutch C¹ being disengaged, the clutch C² is also disengaged as in Figure 3. This frees the frame F¹ but locks the frame F² by reason of the one-way clutch C⁴ holding the frame F² stationary with respect to the disc 50 which disc in turn is held stationary through the sleeve 40, the disc 42 and the clutch C³ relative to the frame F³ which is also held stationary at that time, the direction of forces being such that the clutch C³ is locked.

With F² locked against rotation, the gear train A through 18, 20, 24 and 26 acts as a straight gear train instead of a planetary type and results in rotation of 26 and thereby the load shaft Ld at a still lower speed, the gear train B again causing an idling rotation of the frame F⁴.

To reverse the transmission, the speed shifting lever 104 is swung back to third position as in Figure 6 and then depressed from the position of Figure 1 to the position of Figure 10 before it is swung counter-clockwise to the position shown in Figure 9 with the cam surface R engaging the flange 90 and thus pushing the flange 90 back to substantially the same position it assumed in Figure 8 with the clutches C¹ and C² disengaging as in Figure 3. The depression of the handle 104 causes the pin 120 to pass downwardly through the connecting slot 126 so that it is then aligned with the arcuate slot 124 instead of the arcuate slot 122 as in Figure 1 and the pin is then permitted by the arcuate slot 124 to swing to reverse position shown in Figures 9 and 10.

The pinion 118 is now in engagement with the rack teeth 116 so that the slide 114 is also shifted to the left from the Figure 1 position to the Figure 10 position and this results in the notch 148 leaving the ball 140 and the notch 144 receiving the ball 138 so that the locking lug 86 is raised and the locking lug 88 is lowered. The frame F³ is therefore free to rotate and the frame F⁴ is locked; frame F¹ is also free to rotate and the clutches C³ and C⁴ are inactive.

Therefore (tracing the action backwards from Ld to Pw), any reverse or counter-clockwise rotation of Ld is accompanied by counter-clockwise rotation of 70, 32 (F²) and 22 at a higher speed than Ld. Since 26 is secured to Ld, and 24 is carried by 22 and meshes with 26, the counter-clockwise rotation of Ld is also accompanied by counter-clockwise rotation of 22 and 20 while they are being carried counter-clockwise by F² and this requires that Pw and 18 be rotating clockwise (at a considerably higher speed than the counter-clockwise rotation of Ld because of the planetary action in the gear train A). Thus the usual clockwise rotation of Pw results in counter-clockwise rotation of Ld.

Instead of swinging the handle 104 to the right in Figure 10 after it is depressed, it may be swung to the left as in Figure 11 for neutral position of the power transmission parts which causes the cam 92 to assume the position shown in Figure 7 with the clutches C¹ and C² in the position of Figure 2 and both locking lugs 86 and 88 raised by their springs 150 because of the balls 138 and 140 being received in the notches 142 and 146 as shown in Figure 11. The clutches C³ and C⁴ are inactive and all four frames are free to rotate since both the frames F³ and F⁴ are unlocked so that the entire assembly of elements surrounding the load shaft Ld rotates as a unit with the planetary gears so rotating as to permit the load shaft to remain stationary while the power disc Pw is continuing in its rotation.

My disclosed power transmission is so arranged that there is never any unmeshing of gears. The normal engine clutch may be provided for clutching the disc Pw with respect to the engine, or the sleeve 16 may be directly connected to the engine if desired. When there is any shifting from one speed to another, it is done simply by the manipulation of the handle 104 to the different positions shown in Figures 6, 7 and 8 and in addition to swinging the handle, it is used to move the shaft 98 longitudinally to shift into the proper position for the reverse and neutral adjustments.

The resulting power transmission permits a smooth shifting from one speed to another in the minimum of time that it takes for one of the clutches $C^1$ to disengage and the other to engage, or for both to engage or disengage as the case may be, and the instant the transmission is out of one gear it is in the next gear without any loss of momentum experienced with the usual combination of declutching, gear shifting and reclutching arrangement. This is particularly valuable on a tractor when plowing, and shifting for instance from low to middle speed or from middle speed to high speed, as the drag of the plows usually stops the tractor in the time that it takes to declutch, shift gears, and reclutch. With my arrangement, there is an immediate transfer from one gear ratio to the next without any interruption of power from the power disc $Pw$ to the load shaft $Ld$.

Some changes may be made in the construction and arrangement of the parts of my power transmission without departing from the real spirit and purpose of my invention, and it is my intention to cover by my claims any modified forms of structure or use of mechanical equivalents which may be reasonably included within their scope.

I claim as my invention:

1. In a power transmission of the character disclosed, a power operated gear, a load shaft to be driven thereby, and means for connecting said power operated gear to said load shaft comprising first, second and third frames rotatable about said load shaft, said third frame held against rotation, an internal gear carried by said first frame, planetary gears meshing with said power driven gear and said internal gear and rotatably carried by said second frame, first and second clutch connections between said second frame and said third frame, a one-way clutch connection between said first clutch and said third frame, and a fourth clutch connection of the one-way type between said second frame and said one-way clutch, whereby direct drive is had by engagement of said first and second clutches, middle speed is had by disengagement of said first clutch and engagement of said second clutch, and low speed is had by disengagement of both said first and second clutches.

2. A power transmission comprising a power operated gear, a load shaft to be driven thereby, and means for connecting said power operated gear to said load shaft comprising first, second and third frames rotatable about said load shaft, said third frame held against rotation, an internal gear carried by said first frame, planetary gears meshing with said power driven gear and said internal gear and rotatably carried by said second frame, a gear on said load shaft meshing with said planetary gears, first and second clutch connections between said second frame and said third frame, a one-way clutch connection between said first clutch and said third frame, and a fourth clutch connection between said second frame and said one-way clutch whereby direct drive is had by engagement of said first and second clutches, middle speed is had by disengagement of said first clutch and engagement of said second clutch, and low speed is had by disengagement of both said first and second clutches.

3. In a power transmission of the character disclosed, a power operated gear, a load shaft to be driven thereby, and means for connecting said power operated gear to said load shaft comprising first, second and third frames rotatable about said load shaft, said third frame held against rotation, an internal gear carried by said first frame, planetary gears meshing with said power driven gear and said internal gear and rotatably carried by said second frame, a first clutch connection between said second frame and said third frame, second and third clutch connections between said second frame and said third frame, and a fourth clutch connection between said second frame and said third frame through said third clutch, whereby direct drive is had by engagement of said first and second clutches, middle speed is had by disengagement of said first clutch and engagement of said second clutch, and low speed is had by disengagement of both said first and second clutches, a fourth frame rotatable about said load shaft, a planetary gear train between said second frame and said fourth frame, and means for selectively stopping the rotation of the third frame while permitting rotation of the fourth frame or stopping rotation of the fourth frame while permitting rotation of the third frame whereby to either secure high, middle or low speed in a forward direction or secure reverse speed at a lower speed than either high, middle or low.

4. In a power transmission of the character disclosed, a power operated gear, a load shaft to be driven thereby, and means for connecting said power operated gear to said load shaft comprising three frames rotatable about said load shaft, an internal gear carried by a first one of said frames, planetary gears meshing with said power driven gear and said internal gear and rotatably carried by a second one of said frames, first and second clutch connection between said second frame and the third one of said frames, a one-way clutch connection between said first clutch and said third frame, and a one-way clutch connection between said second frame and said third frame through said first one-way clutch connection, whereby direct drive is had by engagement of said first and second clutches, middle speed is had by disengagement of said first clutch and engagement of said second clutch, and low speed is had by disengagement of both said first and second clutches, a fourth frame rotatable about said load shaft, a gear driven by said second frame, an internal gear carried by said fourth frame, planetary gears rotatably carried by said load shaft and meshing with said last mentioned gear and internal gear, and means for selectively stopping the rotation of the third frame while permitting rotation of the fourth frame or viceversa whereby to either secure high, middle speed or low speed in a forward direction or secure reverse speed operation of said load shaft.

5. In a power transmission, a load shaft, a power driven gear for rotating said load shaft, and transmitting mechanism between said power driven gear and said load shaft comprising first, second, third and fourth frames rotatable about said load shaft, planetary gears carried by said second frame, an internal gear carried by said first frame and meshing therewith, said planetary gears meshing with said power driven gear, a first clutch connection between said second and third frames, a second clutch connection between said first and third frames, a third clutch connection of the one-way type from said first and second clutch connections to said third frame, a fourth clutch connection between said first clutch and said second frame, said last clutch connection being also of the one-way type, a gear train between said second and fourth frames for reversing action, wherein a gear is carried by said second frame, planetary gears mesh therewith and are rotatably carried by said load shaft and an internal gear is carried by said fourth frame and meshes with said planetary gears and means for selectively stopping the rotation of said third and fourth frames.

6. In a power transmission, a load shaft, a power driven gear for rotating said load shaft, and transmitting mechanism between said power driven gear and said load shaft comprising first, second, third and fourth frames rotatable about said load shaft, planetary gears carried by said second frame, an internal gear carried by said first frame and meshing therewith, said planetary gears meshing with said power driven gear, a first clutch connection between said second frame and a third clutch, a second clutch connection with said first frame and said third clutch, said third clutch being of the one-way type and being connected with said third frame to drive it through either said first or said second clutch, a fourth clutch connection from said first and second clutches to said second frame, said last clutch connection being also of the one-way type, a gear train between said second and fourth frames for reversing action wherein a gear is carried by said second frame, planetary gears mesh therewith and are rotatably carried by said load shaft and an internal gear is carried by said fourth frame and meshes with said planetary gears, and means for selectively stopping the operation of said third and fourth frames.

7. In a power transmission, a load shaft, a power driven gear for rotating said load shaft, and transmitting mechanism between said power driven gear and said load shaft comprising first, second, third and fourth frames rotatable about said load shaft, planetary gears carried by said second frame, an internal gear carried by said first frame and meshing therewith, said planetary gears meshing with said power gear, a first clutch connection with said second frame, a second clutch connection with said first frame, said first and second clutch connection being with a third clutch connection to said third frame, said third clutch connection being of the one-way type, a fourth clutch connection between said first and second clutches and said second frame, said last clutch connection being also of the one-way type, a gear train between said second and fourth frames for reversing action wherein a gear is carried by said second frame, planetary gears mesh therewith and are rotatably carried by said load shaft and an internal gear is carried by said fourth frame and meshes with said planetary gears, and means for selectively stopping the operation of said third and fourth frames comprising locking lugs for each frame and a rotatably and longitudinally shiftable shaft, a cam rotated thereby for engaging and disengaging said first and second clutches, a slide adapted to be slid by rotation of said shaft when it is longitudinally shifted to a different position, said slide having detent means for actuating said locking lugs for causing one to lock the third frame and the other to release the fourth frame or vice versa, or for raising both of them for permitting rotation of the third and fourth frames in a neutral position of the power transmission.

8. In a power transmission, a load shaft, a power driven gear for rotating said load shaft, and transmitting mechanism between said power driven gear and said load shaft comprising first, second, third and fourth frames rotatable about said load shaft, a pair of planetary gear trains from said power driven gear to said load shaft, clutch connections between said frames, and means for selectively stopping the operation of certain of said frames, said means comprising locking lugs for said frames and a rotatably and longitudinally shiftable shaft, a cam rotated thereby for engaging and disengaging certain of said clutches, a slide adapted to be slid by rotation of said shaft when it is longitudinally shifted to a different position, said slide actuating said locking lugs for causing one to lock one frame and the other to release another frame or vice versa, or for raising both of them for permitting rotation of both said frames in a neutral position of the power transmission.

9. In a power transmission of the character disclosed, a power operated gear, a load shaft to be driven thereby, and means for connecting said power operated gear to said load shaft comprising a first frame and a second frame rotatable about said load shaft, a third frame held against rotation, an internal gear carried by said first frame, planetary gears meshing with said power driven gear and said internal gear and rotatably carried by said second frame, first and second clutch connections between said second frame and said third frame, a one-way clutch connection between said first clutch and said third frame, a clutch connection between said second frame and said third frame through said one-way clutch connection, and a fourth clutch connection of the one-way type between said second frame and said third frame through said third clutch, whereby direct drive is had by engagement of said first and second clutches, middle speed is had by disengagement of said first clutch and engagement of said second clutch, and low speed is had by disengagement of both said first and second clutches, a fourth frame rotatable about said load shaft, a gear driven by said second frame, an internal gear carried by said fourth frame, planetary gears rotatably carried by said load shaft and meshing with said last mentioned gear and internal gear, and means for selectively stopping the rotation of the third frame while permitting rotation of the fourth frame or stopping rotation of the fourth frame while permitting rotation of the third frame whereby to either secure high, middle or low speed in a forward direction or secure reverse speed at a lower speed than either high, middle or low, said means comprising locking lugs for said third and fourth frames and a rotatably and longitudinally shiftable shaft, a cam rotated thereby for engaging and disengaging said first and second clutches, a slide adapted to be slid by rotation of said shaft when it is longitudinally shifted to a different position, said slide having means for actuating said locking lugs for causing one to lock the third frame and the other to release the fourth frame or vice versa, or for raising both of them for permitting rotation of the third and fourth frames in a neutral position of the power transmission.

10. In a power transmission, a power operated gear, a load shaft to be driven thereby, and means for operatively connecting said power operated gear to said load shaft comprising first, second and third frames rotatable about said load shaft, an internal gear carried by said first frame, planetary gears meshing with said power driven gear and said internal gear and rotatably carried by said second frame, first and second clutch connections between said second frame and said third frame, a one-way clutch connection between said first clutch and said third frame, a clutch connection between said second frame and said third frame through said one-way clutch connection, a fourth clutch connection of the one-way type between said second frame and said third clutch with respect to said third frame, whereby direct drive is had by engagement of said first and second clutches, middle speed is had by disengagement of said first clutch and engagement of said second clutch, and low speed is had by disengagement of both said first and second clutches, a fourth frame also rotatable about said load shaft, a gear driven by said second frame, an internal gear carried by said fourth frame, planetary gears rotatably carried by said load shaft and meshing with said last mentioned gear and internal gear, and means for selectively stopping the rotation of the third frame while permitting rotation of the fourth frame or stopping rotation of the fourth frame while permitting rotation of the third frame whereby to either secure high, middle or low speed in a forward direction or secure reverse speed at a lower speed than either high, middle or low.

DONALD L. MOUNT.

References Cited in the file of this patent

UNITED STATES PATENTS

| Number | Name | Date |
|---|---|---|
| 817,908 | Golberth | Apr. 17, 1906 |
| 1,597,179 | Conkling | Aug. 24, 1926 |
| 1,619,701 | Chorlton | Mar. 1, 1927 |